United States Patent [19]
Bachel

[11] 4,272,154
[45] Jun. 9, 1981

[54] CONNECTING PLUG FOR DETACHABLY CONNECTING TWO LIGHT WAVE GUIDE CABLES

[75] Inventor: Ernst Bachel, Geltendorf, Fed. Rep. of Germany

[73] Assignee: Siemens Aktiengesellschaft, Berlin & Munich, Fed. Rep. of Germany

[21] Appl. No.: 969,192

[22] Filed: Dec. 13, 1978

[30] Foreign Application Priority Data

Dec. 30, 1977 [DE] Fed. Rep. of Germany ....... 2759002

[51] Int. Cl.³ .................................................. G02B 5/16
[52] U.S. Cl. ................................................... 350/96.22
[58] Field of Search ................ 350/96.20, 96.21, 96.22

[56] References Cited

U.S. PATENT DOCUMENTS

| | | | |
|---|---|---|---|
| 3,800,388 | 4/1974 | Börner et al. ....................... | 29/200 P |
| 3,846,010 | 11/1974 | Love et al. ......................... | 350/96.22 |
| 3,870,395 | 3/1975 | Schicketanz ........................ | 350/96.21 |
| 4,079,927 | 3/1978 | Rocton ................................ | 269/296 |
| 4,088,386 | 5/1978 | Hawk ................................... | 350/96.21 |
| 4,101,198 | 7/1978 | Heldt .................................... | 350/96.20 |
| 4,113,346 | 9/1978 | Jackson et al. ..................... | 350/96.20 |
| 4,142,776 | 3/1979 | Cherin et al. ....................... | 350/96.21 |
| 4,149,072 | 4/1979 | Smith et al. .................... | 350/96.21 X |
| 4,155,624 | 5/1979 | Logan et al. ........................ | 350/96.20 |
| 4,183,616 | 1/1980 | Benoit et al. ....................... | 350/96.20 |
| 4,184,742 | 1/1980 | Corrales ............................. | 350/96.21 |

FOREIGN PATENT DOCUMENTS

| | | | |
|---|---|---|---|
| 2159327 | 6/1973 | Fed. Rep. of Germany . | |
| 2233916 | 1/1974 | Fed. Rep. of Germany . | |
| 2237444 | 2/1974 | Fed. Rep. of Germany . | |
| 2345273 | 3/1974 | Fed. Rep. of Germany . | |
| 2651981 | 6/1977 | Fed. Rep. of Germany . | |
| 2805949 | 8/1978 | Fed. Rep. of Germany ........ | 350/96.21 |
| 2807860 | 8/1978 | Fed. Rep. of Germany ........ | 350/96.21 |
| 601821 | 7/1978 | Switzerland ......................... | 350/96.21 |
| 1425264 | 2/1976 | United Kingdom ................. | 350/96.20 |
| 1449156 | 9/1976 | United Kingdom . | |

*Primary Examiner*—John K. Corbin
*Assistant Examiner*—John D. Lee
*Attorney, Agent, or Firm*—Hill, Van Santen, Steadman, Chiara & Simpson

[57] ABSTRACT

A two-part connecting plug for light wave guide optical fibers which have ends positioned on a flat surface (3) by means of a cover plate (4) with precisely milled grooves (16). The connecting plug parts (13) respectively have end faces (11), lateral (8) locating seats and locating seats (10) extending in the plug direction as reference planes and are biased by means of a single installation means (12) which exerts a force component on all three reference planes in such manner that the parts snugly fit against one another at their three reference planes. A middle piece (14) with corresponding reference planes (8, 10) is used between two like connecting components (13), into which middle piece the connecting components (13) are pressed to seat on the reference planes by means of a ring nut (12) and one pressure pin (6) for each. (FIGS. 3, 4, 6).

4 Claims, 6 Drawing Figures

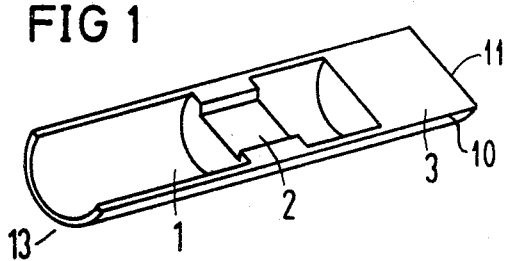
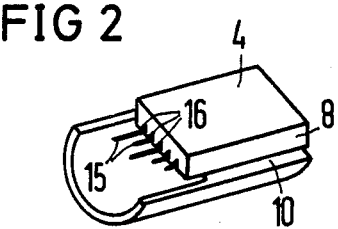
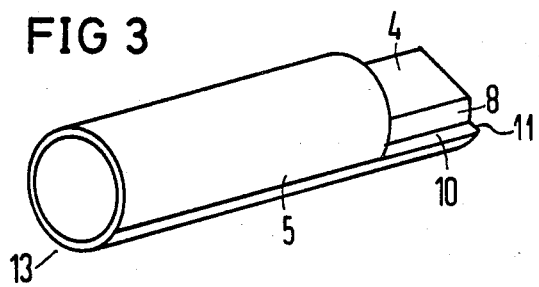
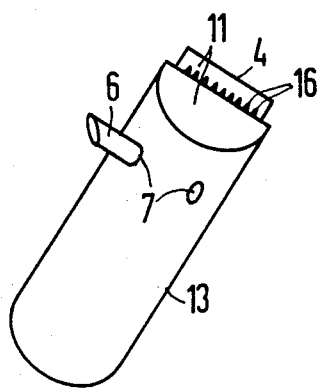
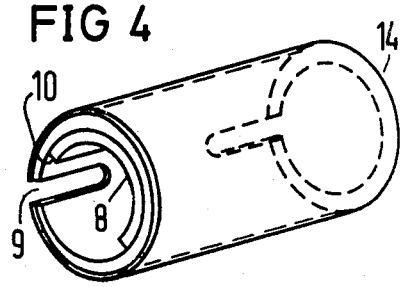
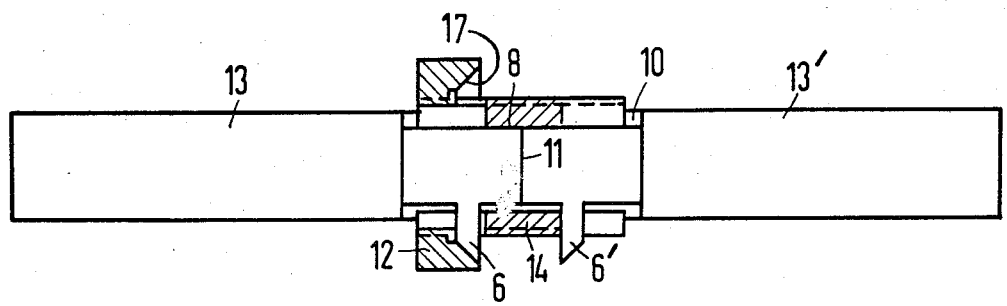

CONNECTING PLUG FOR DETACHABLY CONNECTING TWO LIGHT WAVE GUIDE CABLES

BACKGROUND OF THE INVENTION

1. Field of the Invention

The invention relates to a connecting plug with at least two portions for detachable connecting of two light optical fiber wave guide cables comprising an arrangement for connecting the light wave guide ends to one another and aligning them with one another. In order to be able to detachably connect light wave guide optical fibers together, considerable care must be made to obtain mutual alignment and centering, particular when a plurality of light wave guide optical fibers are to be connected with corresponding, continuing light wave guide optical fibers.

2. Description of the Prior Art

For example, an apparatus for aligning two optical components is described in U.S. Pat. No. 3,800,388. German OS No. 2,237,444 relates to a process for coupling optical components in which the light wave guides to be connected are first glued or bonded to carrier elements which, while observing the coupling values by means of corresponding measurements with measuring means, are then displaced with respect to one another until the optimum coupling is attained. A further alignment technique is described in U.S. Pat. No. 3,870,395 where a capillary tube is used for guiding and centering the light wave guides. In the process for connecting light wave guide optical fibers according to GB Pat. No. 1,449,156, V-shaped grooves are used for guiding and aligning of the light wave guides. A further arrangement is described in U.S. Pat. No. 4,079,927.

SUMMARY OF THE INVENTION

The object underlying the invention is to a connecting plug in which the alignment of the light wave guide ends to be connected to one another occurs with relatively small outlay but with high precision. For achieving this object, the invention provides for a connecting plug which is characterized in that both plug parts of a two-part connecting plug each have end faces, lateral locating seats and locating seats extending in the plug direction and both plug parts are aligned with one another by means of the reference planes formed by these surfaces and are biased against one another by means of one single installation means exerting a force component on all three reference planes in such manner that they fit snugly to one another at their three reference planes. In an advantageous manner, the connecting plug consists of two like connecting plug parts and of a middle piece connecting these to one another which have the corresponding reference planes as outer support opposed bearings to the reference planes of the connecting plug parts.

Further objects, features and advantages will be apparent from the following description and claims which read in view of the drawings, in which:

BRIEF DESCRIPTION OF THE DRAWINGS

FIG. 1 is a perspective view of the connecting means of the invention.
FIG. 2 illustrates the holding plate.
FIG. 3 illustrates the cover member in place.
FIG. 4 illustrates the biasing means.
FIG. 5 shows the locking pins, and
FIG. 6 is a sectional view through the coupling.

DESCRIPTION OF THE PREFERRED EMBODIMENTS

The invention is explained on the basis of a sample embodiment illustrated in FIGS. 1 through 6. As can be seen from FIG. 6, a particularly advantageous embodiment consists of the two plug parts 13 and 13' according to FIG. 3 each having a fiber guiding plate 4 and a cover 5. Common middle coupling piece 14 shown in FIG. 4 accepts the end-facing portions of the two plug parts 13, 13'. Two ring nuts 12 press the end-facing portions of the plug parts 13, 13' into the middle piece 14 by means of the pins 6, 6' and effect the seating of their reference planes 8, 10, 11 when the ring nuts are tightened.

As can be seen from FIG. 1, the plug part 13 has an area 1 for supporting the cable and an area 2 for fastening the vein sleeves and a flat surface 3 which forms a seat for the light wave guide optical fibers 15. After clamping the cable and the vein sleeves, the light wave guide optical fibers 15 are laid over the flat surface 3 and are divided and aligned by means of for example, a comb-like auxiliary tool and the cover plate 4 which has grooves 16 for locking the fibers is placed over the fibers and is a fiber-guiding plate, and a lateral and end face stop of the auxiliary tool determines the position of the cover plate 4 on the plug part 13. The end face alignment of the cover plate 4 and the light wave guide optical fibers 15 (FIG. 2) ensues only after the fibers 15 are seated in the grooves 16 of the cover plate 4. The cover plate 4 is then screwed or glued to the flat surface 3. Subsequently, the plug cover 5 shown in FIG. 3 is placed onto the plug and sealed thereto, for example, by means of casting resin. Finally, according to FIG. 5 which shows a bottom view of the device illustrated in FIG. 3, the pin 6 is inserted into one of the bores 7 formed in member 13. Because of the necessity of putting both plug pins 6 and 6' according to FIG. 6 laterally against the same surface 8 of the middle piece 14, shown in FIG. 4, the direction of force in the two plug parts 13 and 13' is different by 180°. Therefore, the pressure pins 6 and 6' must be arranged mirror-inverted in the case of plug parts 13 and 13' which mate together. Since the pressure pins 6 and 6' are interchangeable, each plug part 13, 13' can be used as a right-hand or left-hand plug part as needed because of the two holes 7 formed in each part. An incorrect joining of the plug parts is not possible because of the guiding slots 9 of the middle piece 14 (FIG. 4).

After insertion of the plug parts 13, 13' into the middle piece 14, the ring nuts 12 are tightened, and they have conical pressure surfaces 17, which cause the pressure pins 6 to press the three reference planes 8, 10, 11 of one plug part 13 onto the corresponding reference planes 8 and 10 of the middle piece 14 or, respectively, onto the end face 11 of the second plug part 13' introduced into the middle piece and thus produce friction-type locking without using springs. In FIG. 6 only the left ring nut 12 is shown but it is to be realized there would be two ring nuts, one for pressing pin 6 and for pin 6'.

As described, the reference planes for the two plug halves in the common middle piece 14 are formed by means of a lateral surface 8 of the cover plate 4, by means of the flat surface 3 of the plug part 13 on which the fibers lie and which has the edge area 10, and by means of the end face 11 of the plug part. An essential prerequisite for the exact alignment of the light wave guide optical fibers to one another are the precisely milled grooves in the cover plate 4. These can be advantageously produced by means of suitable tools in a single work step while processing the reference planes 8. Since the light wave guide optical fibers 15 are supported directly on the flat surface 3, this surface determines the position of the fibers with regard to the plug part 13, whereas the grooves 16, within certain dimensioning limits of their form and depth, only determine an exact alignment of the fibers to the reference plane 8. Upon joining, thus, both plug parts 13, 13' must be seated and biased against one another in the common middle piece 14 at three surfaces 8, 10, 11. A particularly advantageous solution of this problem is obtained when the respective plug part 13 is biased against the middle piece 14 by means of a ring nut 12. The bezel 17 of the nut 12 exerts a force directed onto the pin 6 of the plug part 13 in such manner that the components of this force effect a secure seating bias of the plug part on all three reference surfaces.

In the sample embodiment illustrated in FIG. 6, it is necessary that the pins 6 of the plug parts 13, 13' which mate together are arranged to be mirror-inverted. When the pins 6, 6' interchangeably introduced, then it is possible to design each plug part 13, 13' according to the respective need. Thus, a predetermined allocation of plug parts is also possible, for example, a plug part in the apparatus with the pin 6 on the left and a plug part for the incoming cable with the pin 6' on the right. Incorrect allocation is then not possible because of the guidance slot in the middle piece 14.

Although the invention has been described with respect to a predetermined embodiment, it is not to be so limited as changes and modifications can be made which are within the full intended scope as defined by the appended claims.

I claim:

1. A plug connector consisting of two plug parts for detachably connecting two light wave guide cables containing optical fibers, in which the plug parts, and hence the optical fiber ends carried in the latter, are aligned relative to one another by means of a sleeve, characterized in that each plug part (13, 13') has three planar seats which are mutually perpendicularly to each other and comprising a first front planar face (11), orientated perpendicularly to the axis of the plug connector, a second lateral planar guide surface (8), lying in a plane parallel to the axis of the plug connector, and a third planar guide surface (10), lying in a plane parallel to the axis of the plug connector and serving as supported surface (3) for the optical fiber ends, said plug connector having a center sleeve (14), for interconnecting the plug parts (13, 13') with the ends of light wave guides aligned and each plug part (13, 13') has a pin shaped extension (6, 6'), projecting radially toward the exterior and a tapered compression surface which is inclined relative to the axis of the plug connector such that application of a force parallel to the plug axis on this compression surface of the extension (6, 6'), for example, by means of nuts (12) threaded to the sleeve (14) which produce force vectors having components acting parallel to the axis and two vectors acting perpendicularly to the axis, whereby the front faces (11) of the plug parts (13, 13') will be pressed against one another and the second and third seats (8, 10) of the plug parts (13, 13') will be pressed against the corresponding seats (8, 10) of the center sleeve (14).

2. A plug connector according to claim 1 characterized in that the sleeve (14) has a pair of guide slots (9) for guiding the pin shaped extensions (6, 6') of the plug parts (13, 13').

3. A plug connector according to claim 1, characterized in that the plug part (13, 13') has one section (1) for light guide cable support, a second section (2) for support of the optical fibers and has further a planar seat supporting surface (3) serving as a support for the light wave guide fibers and forms said guide surface (10).

4. A plug connector according to claim 3 including a cover plate (4) which lies on the planar supporting surface (3) and is formed with fiber receiving grooves (16).

* * * * *